United States Patent [19]
Kim

[11] Patent Number: 5,278,718
[45] Date of Patent: Jan. 11, 1994

[54] CIRCUIT FOR GENERATING A DISK CHANGE SIGNAL

[75] Inventor: Jik Kim, Kyounggi, Rep. of Korea

[73] Assignee: SamSung Electronics Co., Ltd., Suwon, Rep. of Korea

[21] Appl. No.: 755,555

[22] Filed: Sep. 5, 1991

[30] Foreign Application Priority Data

May 24, 1991 [KR] Rep. of Korea ............... 1991-8451

[51] Int. Cl.⁵ .............................. G11B 17/22
[52] U.S. Cl. .................... 360/137; 360/71; 369/58
[58] Field of Search ............ 360/137, 71; 369/54, 369/58

[56] References Cited

U.S. PATENT DOCUMENTS 4,796,249 1/1989 Bass .................................. 369/58
5,150,340 9/1992 Miura et al. ...................... 360/71

Primary Examiner—Paul M. Dzierzynski
Assistant Examiner—Richard Hanig
Attorney, Agent, or Firm—Robert E. Bushnell

[57] ABSTRACT

A disk change signal generating circuit which uses an index sensor includes an index sensor for generating an index pulse in order to detect a rotation of a floppy disk, a timer for inputting the output of the index sensor into a clear terminal and inputting a clock signal into a clock terminal, thereby generating a counting value in a predetermined frequency, and a disk change signal generating circuit for generating a disk change signal by inputting the output of the timer.

9 Claims, 3 Drawing Sheets ial timing diagram of FIG. 2.

CIRCUIT FOR GENERATING A DISK CHANGE SIGNAL

BACKGROUND OF THE INVENTION

The present invention relates to a floppy disk driving apparatus, particularly to a circuit which generates a disk change signal for detecting existence of a floppy disk inserted thereto.

Conventionally known is a floppy disk driving apparatus with an index sensor which detects the rotation of the floppy disk and a disk-in sensor which detects the insertion of the floppy disk. FIG. 1A and 1B show schematic diagram of the conventional floppy disk driving apparatus.

Referring to FIG. 1A, when a floppy disk is inserted into a floppy disk driving apparatus, light-receiving transistor PQ1 is turned off, cutting off an emitted light from the light emitting diode $PD_1$ of the disk-in sensor S1. If light-receiving transistor PQ1 is turned off, a logic signal of a line 1 becomes high level signal and then the high level signal is applied to clear terminal a flip-flop $FF_1$.

Applying disk change reset signal from a controller in the clock terminal CLK of the flip-flop $FF_1$, thereby outputs the logic high level signal through the output terminal Q of the flip-flop $FF_1$ and then the disk-in sensor detects the insertion of the floppy disk. Changing the disk change signal logic "high level" outputted from the flip-flop, the controller senses the disk change signal, and thereby regularly controls the floppy disk driving apparatus.

When the floppy disk is ejected from the floppy disk driving apparatus, the disk-in sensor S1 is operated, and outputted logic "low level signal" through the line 1, thereby the output signal of logic "low level signal" is applied to the clear terminal CLR of the flip-flop $FF_1$ and then the flip-flop is cleared. Thereby, the logic "low level signal" is outputted through the output terminal Q of the flip-flop $FF_1$. When the disk change signal outputted from the output terminal of the flip-flop $FF_1$ becomes the logic "low level signal", the controller detects a extraction of the floppy disk.

Referring to FIG. 1B which is a circuit for detecting a rotation of the floppy disk, an index sensor S2 is operated by a cycle the rotation of the floppy disk, thereby an index sensing circuit 10 detects an index pulse. Conventional floppy disk driving apparatus as shown FIG. 1A and 1B comprises the disk-in sensor and the index sensor, thereby a circuit, of floppy disk driving apparatus is complex and requires a large printed circuit board.

SUMMARY OF THE INVENTION

An object of the present invention is to provide a disk change signal generating circuit in which the disk change signal is generated by using the index sensor.

Another object of the present invention is to provide a floppy disk driving apparatus in which the disk-in sensor is integrated into a LSI (Large Scale Integrated Circuit) by using the index sensor.

According to the present invention, the inventive circuit may be accomplished with the LSI by generating the disk change signal which detects the insertion of the floppy disk by using the index sensor, and the designer simplifies the structure of the apparatus.

DETAILED DESCRIPTION OF THE PREFERRED EMBODIMENT

Figure 1A:
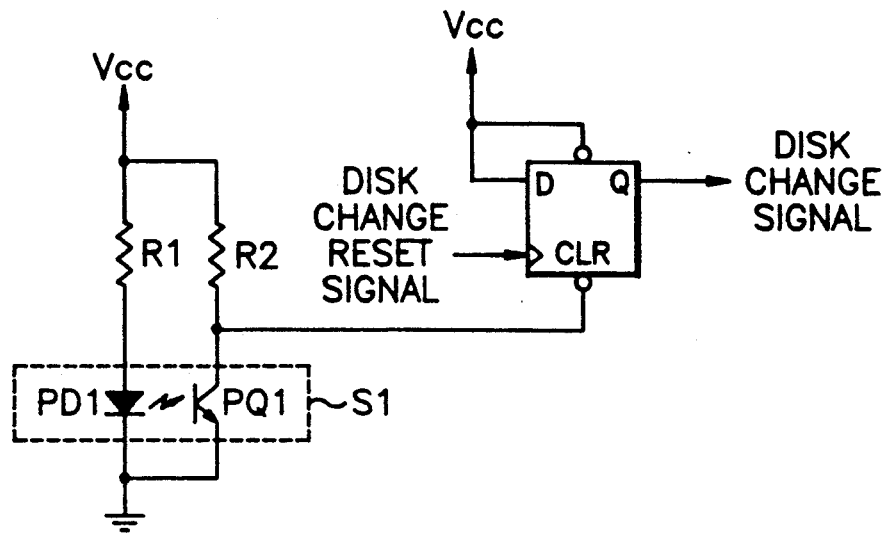
FIG. 1A shows a conventional disk change signal generating circuit diagram.
Figure 1B:
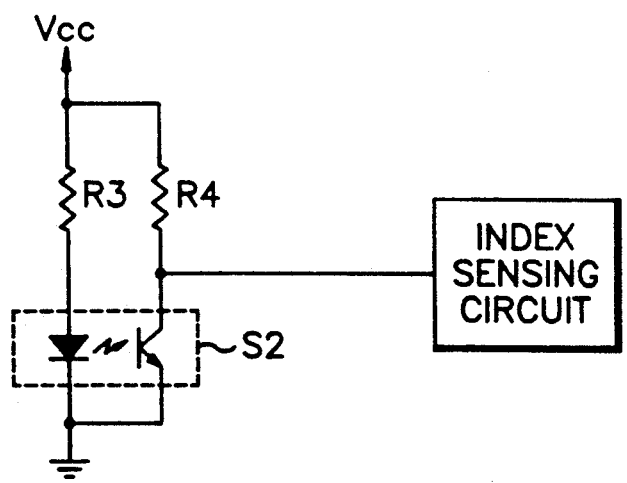
FIG. 1B shows a conventional circuit diagram for detecting a rotation of a floppy disk.
Figure 2:
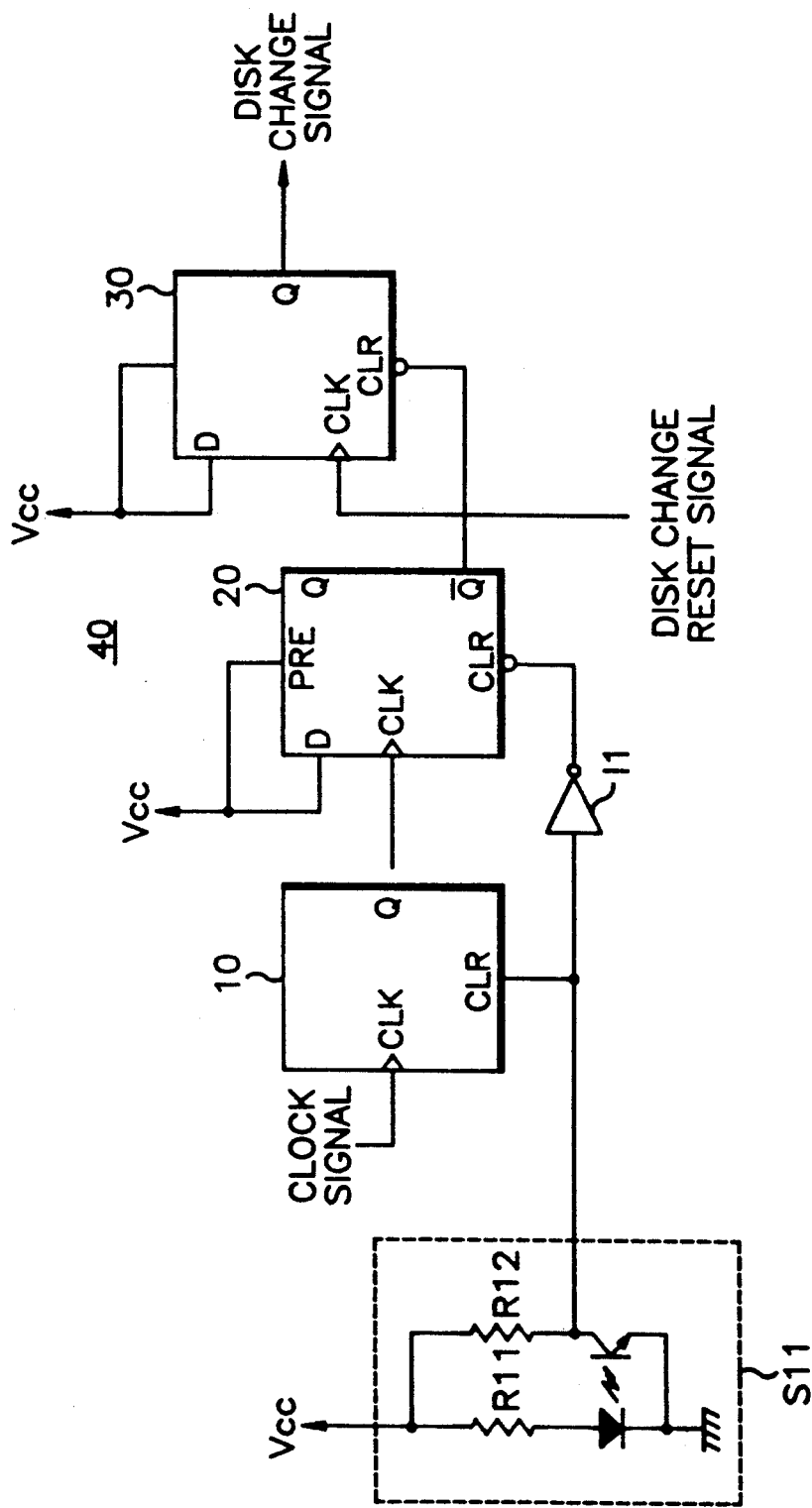
FIG. 2 shows a disk change signal generating circuit according to the present invention.

Referring to FIG. 2, the circuit comprises an index sensor $S_{11}$, a timer 10, and two D-type flip-flops 20 and 30. The index sensor $S_{11}$ generates an index pulse for detecting a disk rotation. The timer 10 receives an output signal from the index sensor $S_{11}$ into a clear terminal CLR and outputs a counting value by a predetermined frequency, inputting a clock signal into a clock terminal CLK. A D flip-flop 20 receives into a clear terminal the inserted output signal of the index sensor $S_{11}$, and outputs into a inverse output terminal Q, a control signal which detects a floppy disk insertion by the output signal from the timer 10. The other D flip-flop 30 outputs a disk change signal, by inputting a disk change reset signal into the clock terminal CLK and the control signal which detects the disk insertion into the clear terminal CLR.

Figure 3:
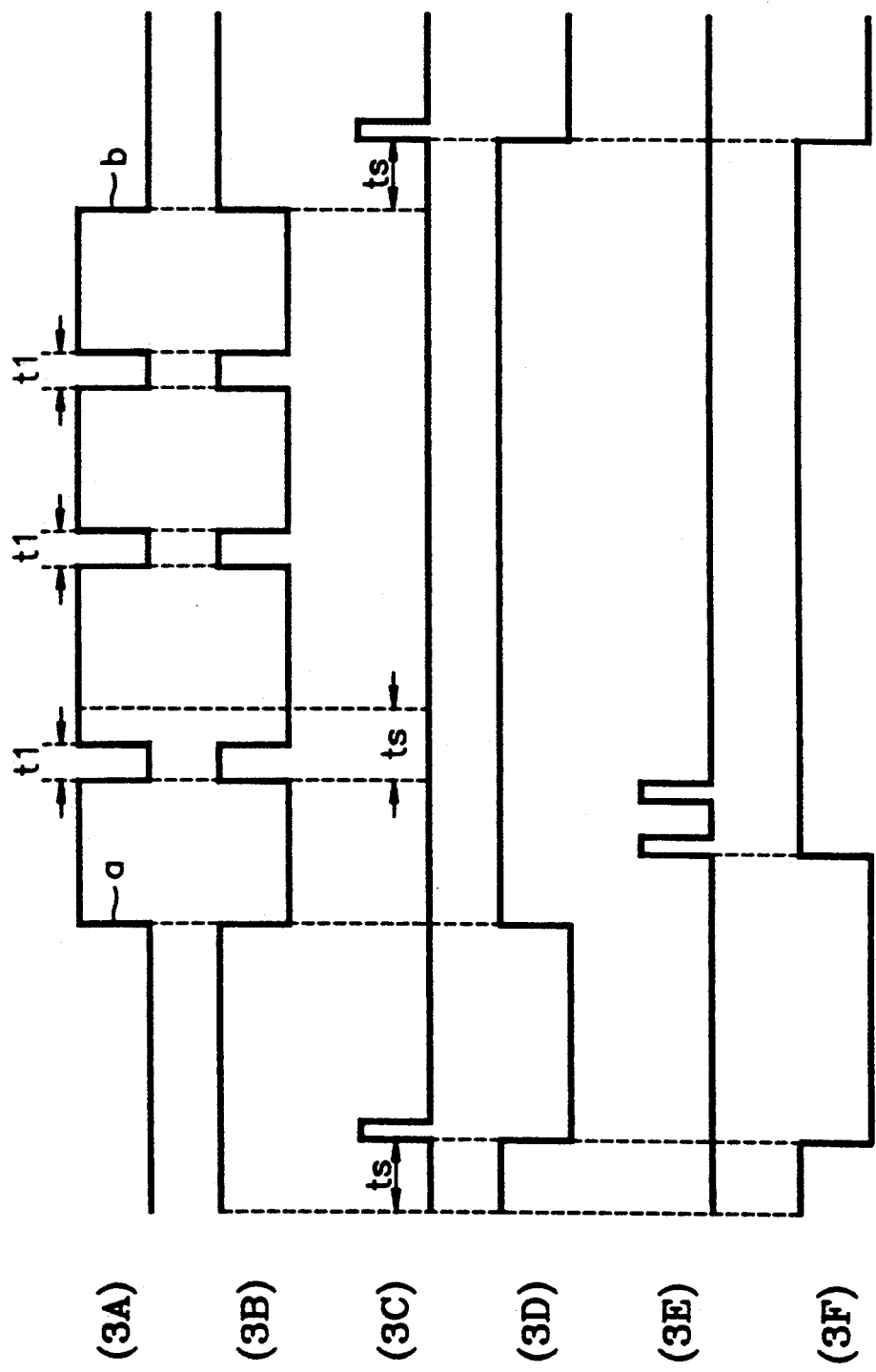
FIG. 3 shows a operational timing diagram of FIG. 2.

FIG. 3 shows a operational timing diagram of FIG. 2 according to the present invention. The index sensor $S_{11}$ regularly generates an index pulse as shown FIG. 3A in a cycle of the floppy disk, when the floppy disk is inserted in the floppy disk driving apparatus and then rotated. The timer 10 which inputs the index pulse generated from the index sensor $S_{11}$ into the clear terminal CLR starts a counting in a falling edge of the index pulse and then outputs the logic "high level" signal into the output terminal Q after counting as much a logic low level region. That is, a time of the timer is established longer than the index pulse width of the drawings 3A and 3B. The index pulse generated from the index sensor $S_{11}$ is applied to the clear terminal CLR of the floppy disk driving apparatus through a inverter $I_1$.

The timer 10 which receives the clock signal from a clock generating circuit (not shown) into the clock terminal CLK, performs the counting during the index pulse of the logic low signal region as shown 3A, but the timer 10 outputs the logic "low level" signal into the output terminal Q of the D flip-flop 20 and apply to the clock terminal CLK of the D flip-flop 20 as shown 3C, when the established time is increased as shown 3B. As the index pulse of the logic "low level" signal outputted from the index sensor $S_{11}$ is inverted by the inverter $I_1$ and is applied to the clear terminal CLR of the D flip-flop 20, the inverse output terminal $\overline{Q}$ of the D flip-flop 20 remains the logic "high level" as shown 3D, without the changing of the state. The logic "high level" signal outputted to the inverse output terminal $\overline{Q}$ of the D flip-flop 20 is applied to the clear terminal CLR of the D flip-flop 20. When the disk change reset signal is inputted in the clock terminal CLK from the controller (not shown) as shown 3E, the output terminal Q outputs the disk change signal of the logic "high level" signal as shown. The index sensor $S_{11}$ detects the insertion of the floppy disk by the logic "high level" signal outputted from the D flip-flop 30.

The index sensor $S_{11}$ outputs continuously the logic low level signal without outputting of the index pulse when the floppy disk inserted in floppy disk driving apparatus is extracted. The timer 10 which inputs into the clear terminal CLK the logic low signal outputted from the index sensor receives and counts the clock signal to clock terminal CLK, when the established time of the timer of the logic "low level" signal is passed as shown 3B, the timer 10 outputs the logic "high level" signal to the output terminal Q as shown 3H.

The logic low level signal outputted from the index sensor $S_{11}$ is inverted by the inverter $I_1$ and is applied to the clear terminal CLR of the D flip-flop 20, thereby the D flip-flop 20 releases the clear state. Therefore, the D flip-flop 20 which receives into the clock terminal CLK the logic high signal outputted from the timer 10, outputs the logic low level signal as shown 3I to the inverse output terminal $\overline{Q}$.

The logic low level signal outputted through the inverse output terminal $\overline{Q}$ of the D flip-flop 20 is applied to the clear terminal CLR of the D flip-flop 30 and clears the value of the D flip-flop, thereby outputs the disk change signal of the logic "low level" signal as shown 3J to output terminal Q. In this case, although the disk change reset signal as shown 3E is inputted into the clock terminal CLK of the D flip-flop 30, the output signal of the output terminal Q maintains the logic low level state. If the disk change signal outputted from the D flip-flop 30 is the logic "low level" state, the index sensor recognizes the state without disk insertion.

Above mentioned, when the floppy disk is inserted in the floppy disk driving apparatus which shields the index sensor $S_{11}$, in the clear terminal CLR of the D flip-flop 30 is applied the logic high level signal from the inverse output terminal $\overline{Q}$ of the D flip-flop 20, thereby the index sensor $S_{11}$ recognizes the insertion of the floppy disk. In this case, although the index pulse is generated by rotating the floppy disk, the term of the logic "low level" signal of the index pulse is ignored until the time established by the timer 10 is passed, and the clear terminal CLR of the D flip-flop 30 maintains the logic "high level". Meanwhile, if the index sensor $S_{11}$ is turned on more than the time established by the timer 10 extracting the floppy disk of the floppy disk driving apparatus, thereby when the clear terminal CLR of the timer 10 maintains the logic "low level", the index sensor recognizes the extraction of the floppy disk by the clear terminal CLR of the D flip-flop 30 and the disk change signal become the logic "low level" signal.

As described above, the inventive circuit may be accomplished with the LSI by generating the disk change signal which detects the insertion of the floppy disk by using the index sensor, and the designer simplifies the structure of the apparatus.

The present invention is not limited to the above embodiments, and various other changes and modifications may be made within the spirit and scope of the invention recited in the appended claims.

What is claimed is:

1. A circuit for generating a disk change signal in a disk driver, comprising:
    index sensing means for generating an index pulse signal in response to a rotation of a disk;
    counting means for generating a counting signal in response to said index pulse signal received into a clear input terminal and a clock signal received into a clock input terminal; and
    output means for generating a disk change signal in response to said counting signal.

2. The circuit according to claim 1, wherein said output means comprises:
    first flip-flop means for generating a control signal indicating insertion of said disk in response to said index pulse signal received into a clear input terminal and said counting signal; and
    second flip-flow means for generating a disk change signal in response to said control signal received into a clear input terminal and a disk change reset signal received into a clock input terminal.

3. The circuit according to claim 2, wherein said first and second flip-flop means each comprise a D-type flip-flop.

4. The circuit according to claim 3, further comprising an inverting means for inverting said index pulse signal received by said first flip-flop means.

5. The circuit according to claim 1, wherein the counting signal is a first level if a time period measured by said counting means is longer than a pulse of said index pulse signal, whereby said output means generates the disk change signal in response to said first level and a disk change reset signal.

6. The circuit according to claim 1, wherein said index sensing means comprises light-emitting means and light-sensing means.

7. The circuit according to claim 1, wherein time period measured by said counting means is longer than a pulse of the index pulse signal when the disk is spinning.

8. The circuit according to claim 1, wherein the disk is a floppy disk.

9. A method for generating a disk change signal in a disk driver, comprising:
    generating an index pulse signal in response to a rotation of a disk;
    measuring a time period of a pulse in said index pulse signal; and
    generating a disk change signal in response to 1) said time period being longer than said pulse; and 2) a disk change reset signal.

* * * * *

UNITED STATES PATENT AND TRADEMARK OFFICE
CERTIFICATE OF CORRECTION

PATENT NO. :       5,278,718
DATED       :       January 11, 1994
INVENTOR(S) :     Jik Kim It is certified that error appears in the above-indentified patent and that said Letters Patent is hereby corrected as shown below:

Column 2,    Lines 39 and 40,    Delete "established".

Signed and Sealed this

Eleventh Day of October, 1994

Attest:

BRUCE LEHMAN

Attesting Officer       Commissioner of Patents and Trademarks